United States Patent
Shigeeda et al.

(10) Patent No.: US 9,531,567 B2
(45) Date of Patent: Dec. 27, 2016

(54) NETWORK SYSTEM

(75) Inventors: Tetsuya Shigeeda, Chiyoda-ku (JP); Shingo Honda, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 0 days.

(21) Appl. No.: 14/408,313

(22) PCT Filed: Jul. 3, 2012

(86) PCT No.: PCT/JP2012/066973
§ 371 (c)(1),
(2), (4) Date: Dec. 16, 2014

(87) PCT Pub. No.: WO2014/006689
PCT Pub. Date: Jan. 9, 2014

(65) Prior Publication Data
US 2015/0195103 A1     Jul. 9, 2015

(51) Int. Cl.
*H04L 12/46* (2006.01)
*H04L 12/709* (2013.01)
*H04L 12/931* (2013.01)

(52) U.S. Cl.
CPC ......... *H04L 12/465* (2013.01); *H04L 12/4641* (2013.01); *H04L 12/4675* (2013.01); *H04L 45/245* (2013.01); *H04L 49/70* (2013.01)

(58) Field of Classification Search
CPC .... H04L 12/46; H04L 12/4641; H04L 12/465; H04L 12/4675; H04L 45/245; H04L 49/70; H04L 29/06095; H04L 29/0653; H04L 45/74; H04L 49/3009; H04L 49/309
(Continued)

(56) References Cited

U.S. PATENT DOCUMENTS 6,308,218 B1    10/2001 Vasa
6,912,589 B1 *   6/2005 Jain ................. H04L 12/1886
                                            370/389
(Continued)

FOREIGN PATENT DOCUMENTS

JP     2000-049845 A     2/2000
JP     2003-060675 A     2/2003
(Continued)

OTHER PUBLICATIONS

International Search Report (PCT/ISA/210) mailed on Aug. 7, 2012, by the Japanese Patent Office as the International Searching Authority for International Application No. PCT/JP2012/066973.
(Continued)

*Primary Examiner* — Chi H Pham
*Assistant Examiner* — Robert Lopata
(74) *Attorney, Agent, or Firm* — Buchanan Ingersoll & Rooney PC

(57) ABSTRACT

A communication apparatus for performing communication among cars of a train includes two or more connection ports, and two or more VLANs set through VLAN numbers in each connection port. When receiving a specific kind of packet for disabling the VLAN settings, the communication apparatus regards the set two or more VLANs as the same network with respect to the specific kind of packet and transfers the packet to a desired destination apparatus set in any one of the VLANs irrespective of the VLAN settings.

2 Claims, 5 Drawing Sheets

(58) Field of Classification Search
USPC .......................................................... 370/392
See application file for complete search history.

(56) References Cited

U.S. PATENT DOCUMENTS

| | | | |
|---|---|---|---|
| 7,420,979 | B2 | 9/2008 | Nozue et al. |
| 7,469,298 | B2 | 12/2008 | Kitada et al. |
| 7,529,244 | B2 | 5/2009 | Tabu |
| 7,912,059 | B1 | 3/2011 | Squire |
| 8,094,660 | B2 | 1/2012 | Nozue et al. |
| 2005/0078632 | A1 | 4/2005 | Aramaki et al. |
| 2006/0067335 | A1* | 3/2006 | Maya .................. H04L 12/2602 370/397 |
| 2006/0274744 | A1* | 12/2006 | Nagai .................. H04L 12/467 370/389 |
| 2006/0282892 | A1* | 12/2006 | Jonnala .............. H04L 63/1458 726/23 |
| 2007/0025348 | A1* | 2/2007 | Nakashima ......... H04L 12/4641 370/389 |
| 2008/0259924 | A1 | 10/2008 | Gooch et al. |
| 2010/0091681 | A1* | 4/2010 | Sonoda ............... H04L 12/4641 370/252 |
| 2010/0278180 | A1* | 11/2010 | Ma ....................... H04L 49/354 370/392 |

FOREIGN PATENT DOCUMENTS

| | | |
|---|---|---|
| JP | 2003-198588 A | 7/2003 |
| JP | 2004-072160 A | 3/2004 |
| JP | 2004-112159 A | 4/2004 |
| JP | 2005-151509 A | 6/2005 |
| JP | 2007-005892 A | 1/2007 |
| JP | 2011-205777 A | 10/2011 |
| TW | 437247 B | 5/2001 |

OTHER PUBLICATIONS

Written Opinion (PCT/ISA/237) mailed on Aug. 7, 2012, by the Japanese Patent Office as the International Searching Authority for International Application No. PCT/JP2012/066973.
Japanese Office Action mailed on Dec. 18, 2012, with English translation, pp. 1-2.
Taiwanese Examination Report mailed on Jul. 24, 2014, with English translation, pp. 1-2.
Extended European Search Report corresponding to European Patent Application No. 12880314.5, issued Mar. 8, 2016; 8 pages.

* cited by examiner

NETWORK SYSTEM

FIELD

The present invention relates to a communication apparatus and a network system that perform communication by VLANs.

BACKGROUND

Communication using VLANs (Virtual Local Area Networks) has been performed. In a system that shares a network, the VLANs can divide and use the network. For example, in a system in which a plurality of communication apparatuses (hubs) are connected, by performing VLAN settings in connection ports of the communication apparatuses (the hubs), one network in physical arrangement can be logically operated as a plurality of networks. Such a technology is disclosed in Patent Literatures 1 to 3.

CITATION LIST

Patent Literature

Patent Literature 1: Japanese Patent Application Laid-Open No. 2007-5892
Patent Literature 2: Japanese Patent Application Laid-Open No. 2003-198588
Patent Literature 3: Japanese Patent Application Laid-Open No. 2004-72160

SUMMARY

Technical Problem

However, according to the conventional technology, communication can be performed only in networks having the same VLAN setting. Therefore, there is a problem in that communication cannot be performed among networks having different VLAN settings even if the networks are connected to one communication apparatus in physical arrangement.

The present invention has been devised in view of the above, and it is an object of the present invention to obtain a communication apparatus and a network system that can perform communication among networks having different VLAN settings.

Solution to Problem

To solves the problem and attain the object, the present invention provides a communication apparatus for performing communication among cars of a train. The communication apparatus includes two or more connection ports, and two or more VLANs set through VLAN numbers in each connection port. When receiving a specific kind of packet for performing communication with apparatuses in other VLANs, the communication apparatus regards the set two or more VLANs as the same network with respect to the specific kind of packet and transfers the packet to a desired destination apparatus.

Advantageous Effects of Invention

The communication apparatus according to the present invention can perform communication among networks having different VLAN settings.

DESCRIPTION OF EMBODIMENTS

Embodiments of a communication apparatus and a network system according to the present invention are explained in detail below with reference to the drawings. Note that the present invention is not limited by the embodiments.

First Embodiment

Figure 1:
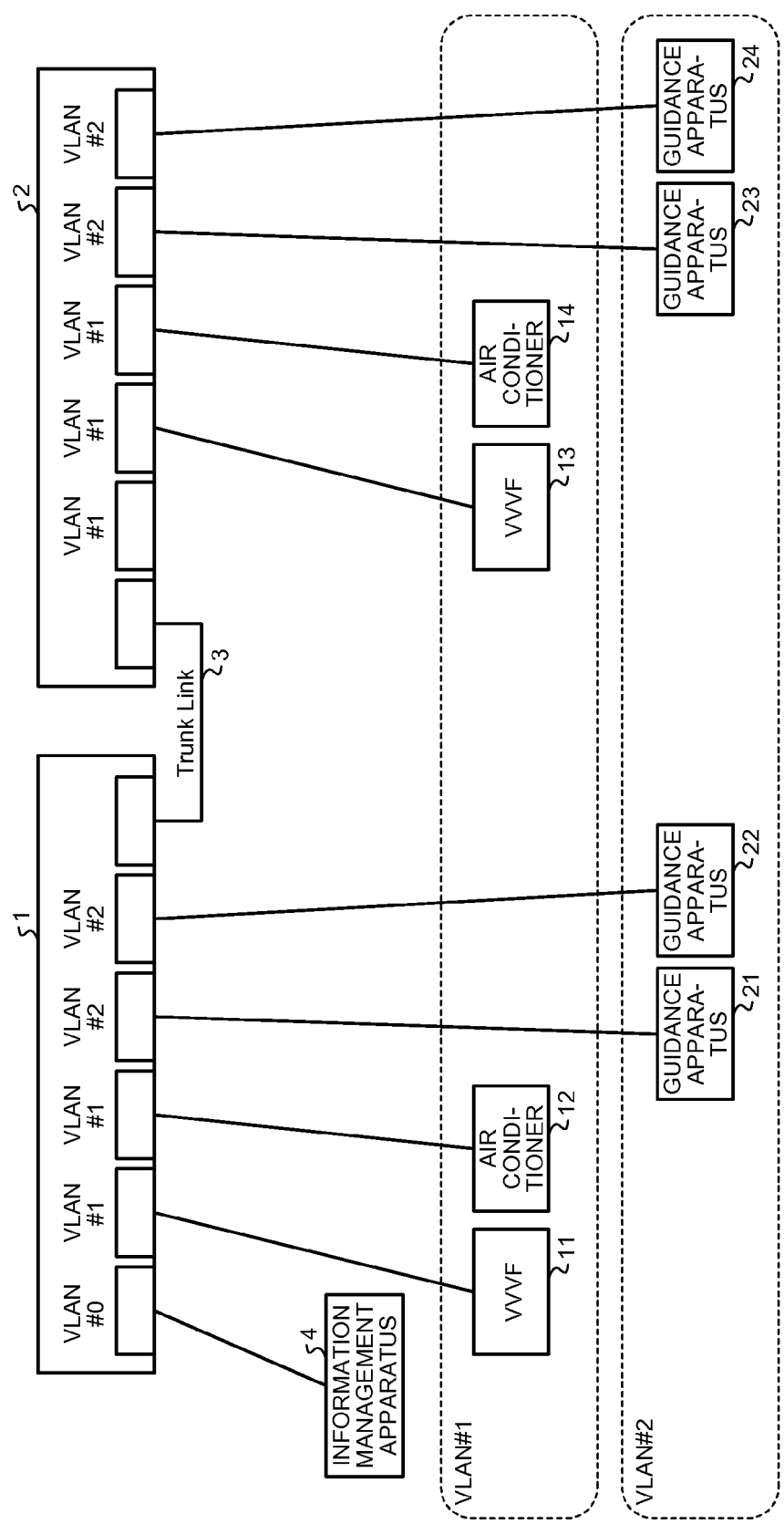
FIG. 1 is a diagram of a configuration example of a network system including communication apparatuses according to a first embodiment.

FIG. 1 is a diagram of a configuration example of a network system including communication apparatuses according to this embodiment. Physical connection of apparatuses is shown. In the network system, communication apparatuses 1 and 2 are connected by a Trunk Link 3. An information management apparatus 4 connected to a VLAN #0 setting port is connected to the communication apparatus 1. A VVVF (Variable Voltage Variable Frequency) 11 and an air conditioner 12 connected to VLAN #1 setting ports and guidance apparatuses 21 and 22 connected to VLAN #2 setting ports are connected to the communication apparatus 1. A VVVF 13 and an air conditioner 14 connected to VLAN #1 setting ports and guidance apparatuses 23 and 24 connected to VLAN #2 setting ports are connected to the communication apparatus 2. The communication apparatuses 1 and 2 include a plurality of connection ports. It is possible to perform a plurality of (three) VLAN settings through VLAN numbers set in each connection ports. Note that, as a specific example of the network system, there is a system that includes, in a train formation, communication apparatuses in cars and connects the cars with the Trunk Link 3 to perform communication among the cars. However, the network system is not limited to such communication among the cars.

As shown in FIG. 1, the VVVF 11, the air conditioner 12, the VVVF 13, and the air conditioner 14 are connected to a network of a VLAN #1 and can usually perform communication only in the network set by this port VLAN #1. The guidance apparatuses 21 to 24 are set in a network of a VLAN #2 and can usually perform communication only in a network set by this port VLAN #2.

When performing communication with the apparatus connected to any one of the VLANs, in this embodiment, the information management apparatus 4 uses a specific kind of packet. The specific kind indicates a port number, an IP address, a MAC address, or the like, equivalent to "80" or "110" in TCP/UDP. When receiving the specific kind of packet from the information management apparatus 4, the communication apparatuses 1 and 2 disable the setting of the port VLANs and operate regarding networks of the VLAN #1 and the VLAN #2 as the same network. Note that, although communication for enabling communication among the VLANs is the port number in the TCP/UDP, the information can be information that can identify a type of communication such as an IP address or a MAC address. If the communication among the VLANs is unicast, ARP communication for enabling unicast communication can be performed among the VLANs.

Figure 2:
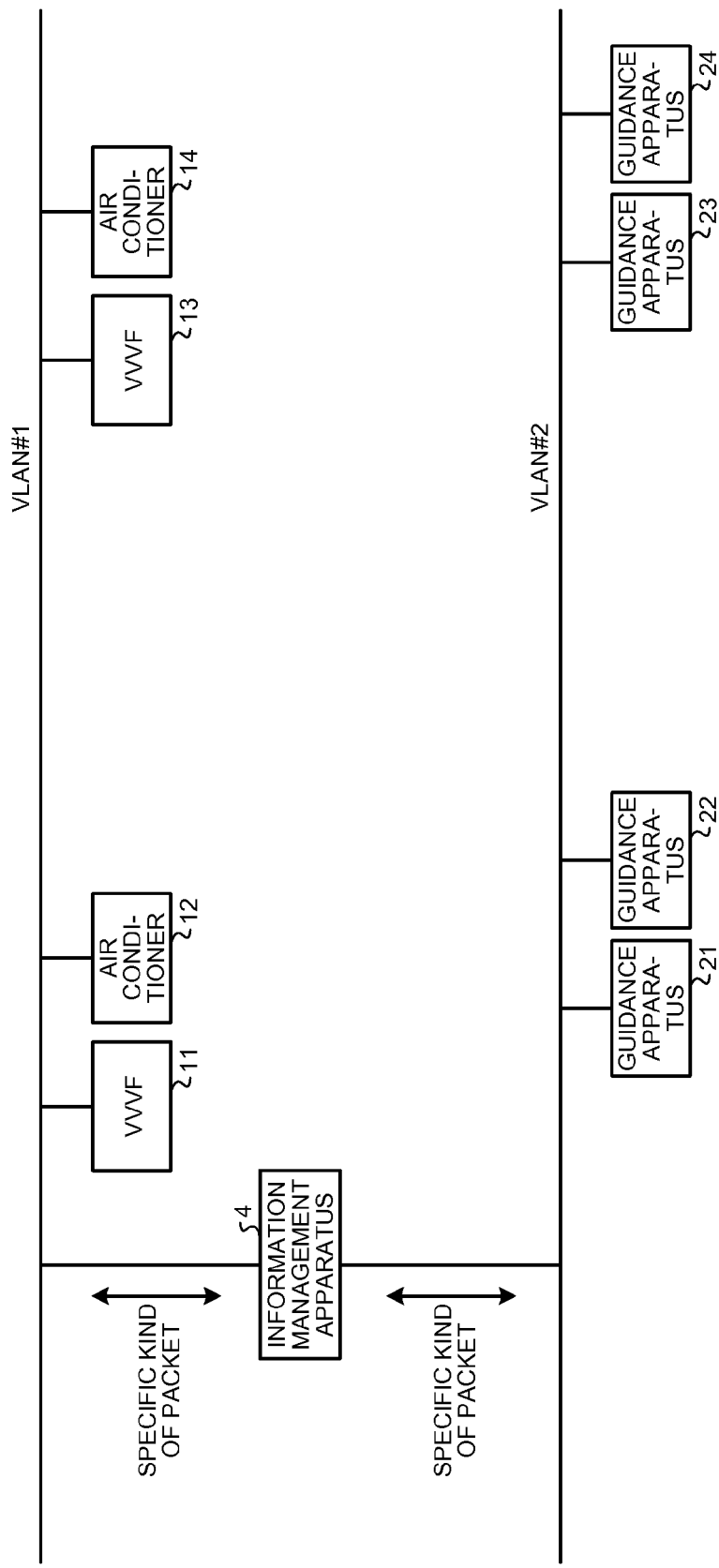
FIG. 2 is a diagram of a logical network configuration in the first embodiment.

FIG. 2 is a diagram of a logical network configuration in this embodiment. A state during transmission of the specific kind of packet is shown. By transmitting the specific kind of packet, irrespective of to which connection ports of the communication apparatuses the apparatuses are connected, the information management apparatus 4 can perform data communication with the apparatuses. For example, when the information management apparatus 4 performs communication with the VVVF 11 on the VLAN #1 side, the information management apparatus 4 transmits the specific kind of packet to the communication apparatus 1. The communication apparatus 1 transfers the specific kind of packet received from the information management apparatus 4 to the VVVF 11, which is a desired destination, irrespective of the setting of the port VLANs (neglecting the setting of the port VLANs).

Similarly, when the information management apparatus 4 communicates with the guidance apparatus 23 on the VLAN #2 side, the information management apparatus 4 transmits the specific kind of packet to the communication apparatus 1. The communication apparatus 1 transfers the specific kind of packet received from the information management apparatus 4 to the communication apparatus 2 through the Trunk Link 3. The communication apparatus 2 transfers the specific kind of packet received from the communication apparatus 1 to the guidance apparatus 23, which is a desired destination, irrespective of the setting of the port VLANs. In this way, the information management apparatus 4 and the apparatuses can perform data communication neglecting the setting of the port VLANs by performing a specific kind of communication.

As explained above, according to this embodiment, when receiving a specific kind of packet from an information management apparatus, a communication apparatus, in which a plurality of port VLANs are set, regards a plurality of VLANs as the same network irrespective of port VLAN settings and transfers the received packet to a desired destination apparatus connected to a connection port. Consequently, in a system that shares networks, it is possible to perform communication among networks having different VLAN settings.

Second Embodiment

In the first embodiment, the information management apparatus directly performs the data communication with the apparatuses connected to the VLANs. In this embodiment, an information management apparatus performs data communication with control apparatuses connected to VLANs. Differences from the first embodiment are explained.

Figure 3:
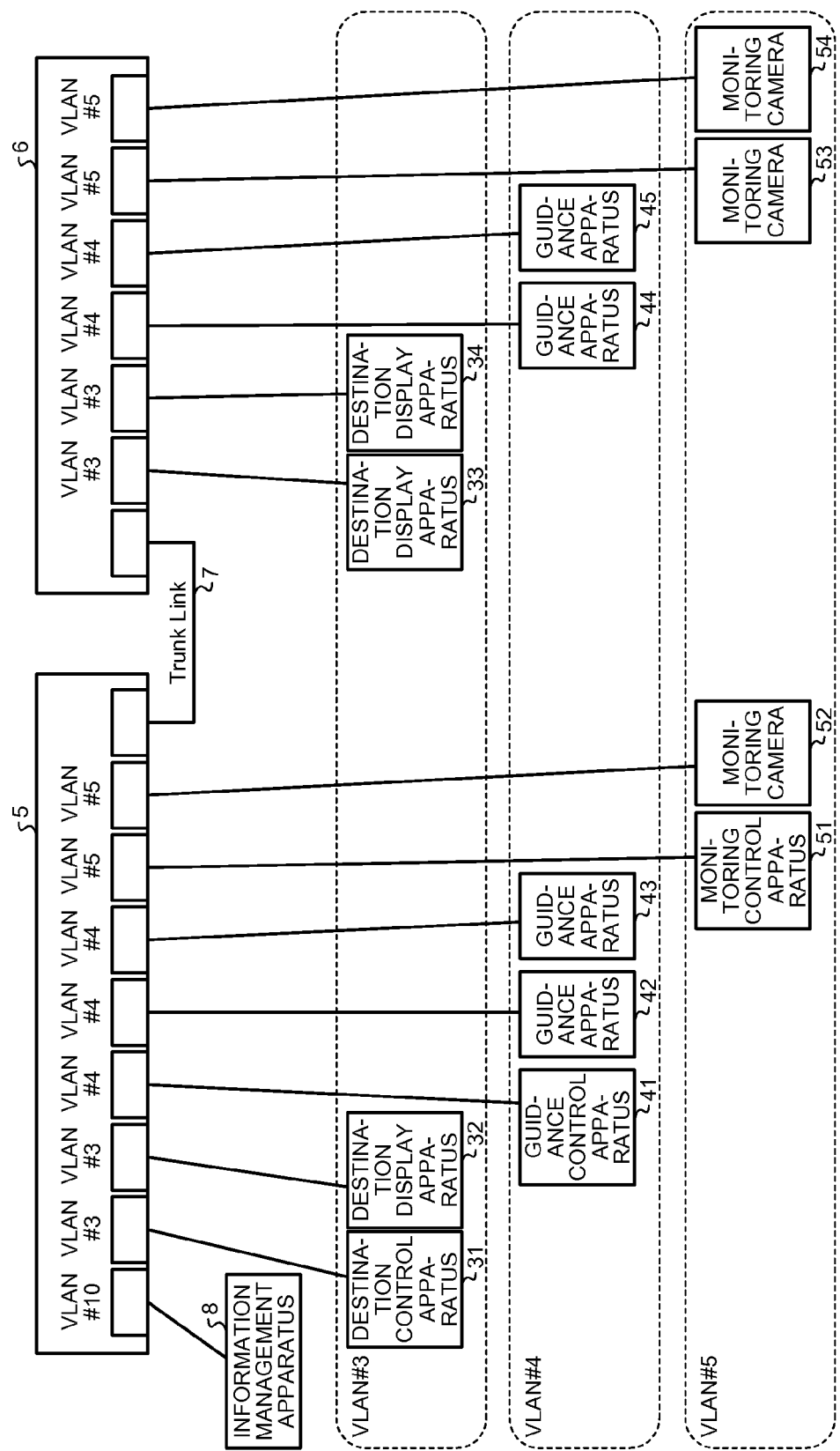
FIG. 3 is a diagram of a configuration example of a network system including communication apparatuses according to a second embodiment.

FIG. 3 is a diagram of a configuration example of a network system including communication apparatuses according to this embodiment. Physical connection of apparatuses is shown. In the network system, communication apparatuses 5 and 6 are connected by a Trunk Link 7. An information management apparatus 8 connected to a VLAN #10 setting port is connected to the communication apparatus 5. A destination control apparatus 31 and a destination display apparatus 32 connected to VLAN #3 setting ports, a guidance control apparatus 41 and guidance apparatuses 42 and 43 connected to VLAN #4 setting ports, and a monitoring control apparatus 51 and a monitoring camera 52 connected to VLAN #5 setting ports are connected to the communication apparatus 5. Destination display apparatuses 33 and 34 connected to VLAN #3 setting ports, guidance apparatuses 44 and 45 connected to VLAN #4 setting ports, and monitoring cameras 53 and 54 connected to VLAN #5 setting ports are connected to the communication apparatus 6. The communication apparatuses 5 and 6 include a plurality of connection ports. It is possible to perform a plurality of (four) VLAN settings according to VLAN numbers set in the connection ports.

Figure 4:
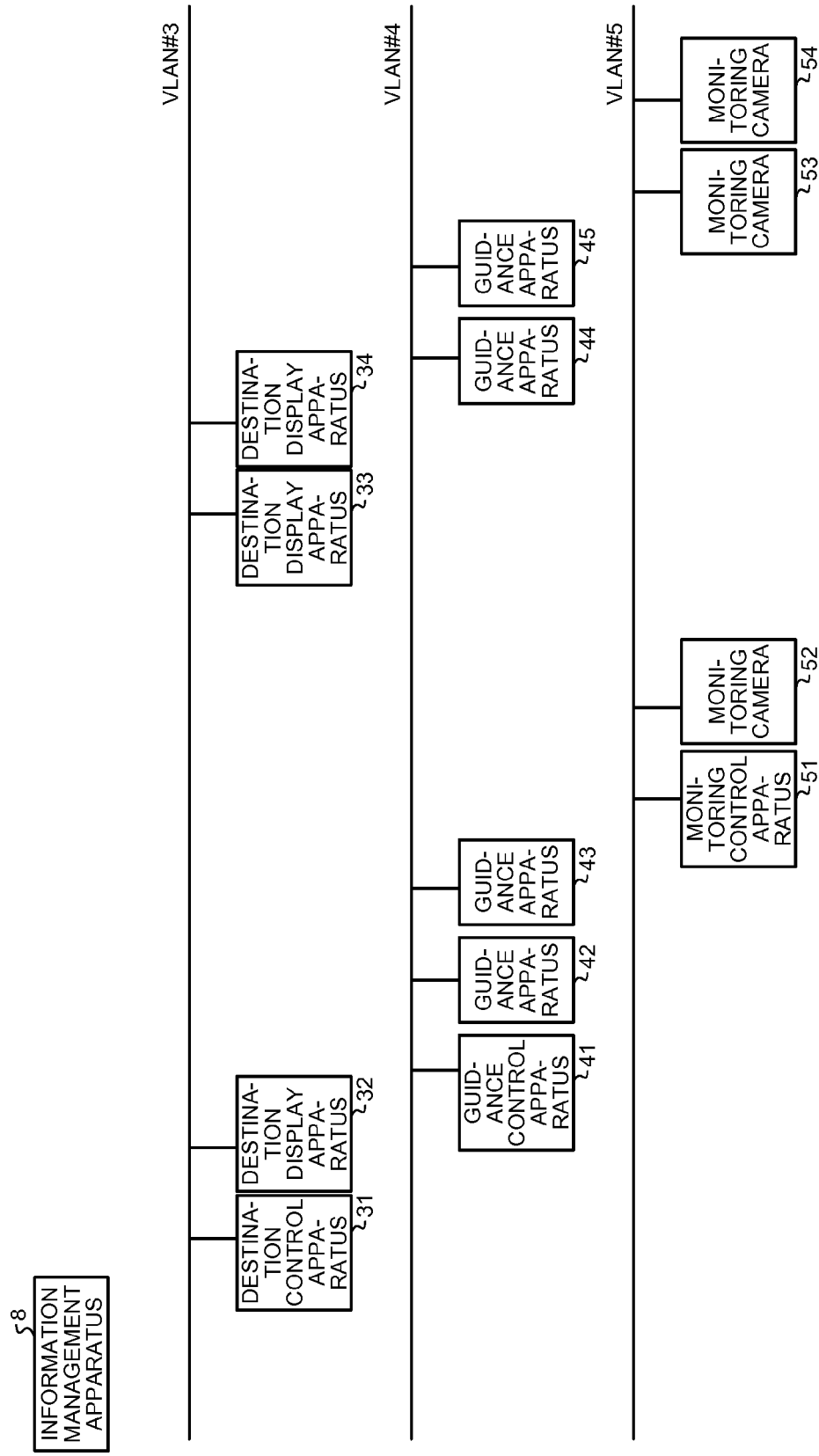
FIG. 4 is a diagram of a logical network configuration at normal time in the second embodiment.

FIG. 4 is a diagram of a network configuration of VLANs at normal time in this embodiment. As shown in FIG. 3 and FIG. 4, the destination control apparatus 31 and the destination display apparatuses 32 to 34 are connected to a network of a VLAN #3. Usually, the destination control apparatus 31 performs communication with the destination display apparatuses 32 to 34 using the VLAN #3. The destination control apparatus 31 can perform communication only in the network set by this port VLAN #3. The guidance control apparatus 41 and the guidance apparatuses 42 to 45 are connected to a network of a VLAN #4. Usually, the guidance control apparatus 41 performs communication with the guidance apparatuses 42 to 45 using the VLAN #4. The guidance control apparatus 41 can perform communication only in the network set by this port VLAN #4. The monitoring control apparatus 51 and the monitoring cameras 52 to 54 are connected to a network of a VLAN #5. Usually, the monitoring control apparatus 51 performs communication with the monitoring cameras 52 to 54 using a VLAN #5. The monitoring control apparatus 51 can perform communication only in the network set by this port VLAN #5.

When it is necessary to perform data communication with the apparatus connected to any one of the VLANs, in this embodiment, the information management apparatus 8 performs communication with the apparatuses of the VLANs using a specific kind of packet. When receiving the specific kind of packet from the information management apparatus 8, the communication apparatuses 5 and 6 disable the setting of the port VLANs and operate regarding networks of the VLANs #3 to #5 as the same network.

Figure 5:
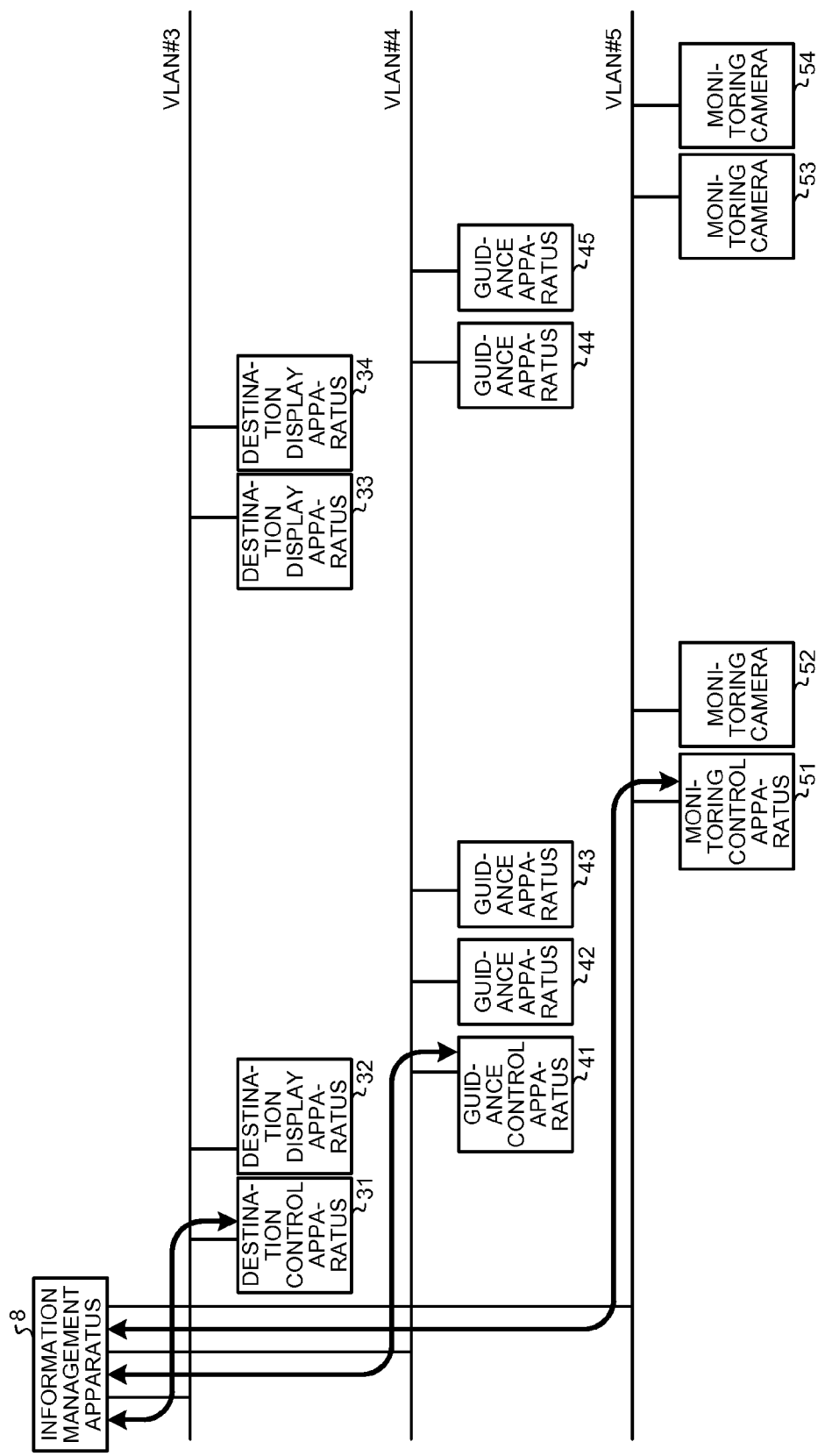
FIG. 5 is a diagram of a network configuration of VLANs during communication of a specific kind of packet in the second embodiment.

FIG. 5 is a diagram of a network configuration of the VLANs during reception of the specific kind of packet in this embodiment. A state during communication of the specific kind of packet is shown. By transmitting the specific kind of packet, the information management apparatus 8 can perform data communication with the apparatuses irrespective of to which connection ports of the communication apparatuses the apparatuses are connected. For example, when the information management apparatus 8 communicates with the destination control apparatus 31 on the VLAN #3 side, the information management apparatus 8 transmits the specific kind of packet to the communication apparatus 5. The communication apparatus 5 transfers the specific kind of packet received from the information management apparatus 8 to the destination control apparatus 31, which is a desired destination, irrespective of the setting of the port VLANs (neglecting the setting of the port VLAN). The destination control apparatus 31 can control display information of the destination display apparatuses 32 to 34 on the basis of the packet received from the information management apparatus 8.

Similarly, when the information management apparatus 8 communicates with the guidance control apparatus 41 on the VLAN #4 side, the information management apparatus 8 transmits the specific kind of packet to the communication apparatus 5. The communication apparatus 5 transfers the specific kind of packet received from the information management apparatus 8 to the guidance control apparatus 41, which is a desired destination, irrespective of the setting of the port VLANs (neglecting the setting of the port VLANs). The guidance control apparatus 41 can control guidance information of the guidance apparatuses 42 to 45 on the basis of the packet received from the information management apparatus 8.

Similarly, when the information management apparatus 8 communicates with the monitoring control apparatus 51 on the VLAN #5 side, the information management apparatus 8 transmits the specific kind of packet to the communication apparatus 5. The communication apparatus 5 transfers the specific kind of packet received from the information management apparatus 8 to the monitoring control apparatus 51, which is a desired destination, irrespective of the setting of the port VLANs (neglecting the setting of the port VLANs). The monitoring control apparatus 51 can control the operation of the monitoring cameras 52 to 54 on the basis of the packet received from the information management apparatus 8. In this way, the information management apparatus 8 and the control apparatuses can perform data communication neglecting the setting of the port VLAN by performing a specific kind of communication.

As an example of use of the system in this embodiment, for example, it is assumed that the system is used in a car. The information management apparatus 8 transmits car information such as position information (a destination station, a rear station, and kilometrage between stations), speed information, and door opening information of the car to the destination control apparatus 31, the guidance control apparatus 41, and the monitoring control apparatus 51. The control apparatuses realize a destination display function, a guidance function, and a monitoring function using the car information acquired from the information management apparatus 8. Note that the destination control apparatus 31, the guidance control apparatus 41, and the monitoring control apparatus 51 collect operation states and failure states of the apparatuses configuring the systems and transmits the operation states and the failure states to the information management apparatus 8 through the specific kind of communication.

As explained above, according to this embodiment, when receiving a specific kind of packet from an information management apparatus, a communication apparatus, in which a plurality of port VLANs are set, regards a plurality of VLANS as the same network irrespective of port VLAN settings and transfers the received packet to a desired destination control apparatus to which a connection port is connected. Control apparatuses perform control of apparatuses in the port VLANs. In this case, in a system that shares networks, it is possible to perform communication among networks having different VLAN settings. It is possible to obtain effects same as the effects in the first embodiment.

REFERENCE SIGNS LIST 1, 2, 5, 6 Communication apparatuses
3, 7 Trunk Links
4, 8 Information management apparatuses
11, 13 VVVFs
12, 14 Air conditioners
21 to 24 Guidance apparatuses
31 Destination control apparatus
32 to 34 Destination display apparatuses
41 Guidance control apparatus
42 to 45 Guidance apparatuses
51 Monitoring control apparatus
52 to 54 Monitoring cameras

The invention claimed is:

1. A network system comprising two or more communication apparatuses, the communication apparatuses being connected by a trunk link,
   each of the communication apparatuses for performing communication among cars of a train, including:
   two or more connection ports; and
   two or more VLANs set through VLAN numbers in each connection port,
   wherein each of the communication apparatuses determines, on the basis of only information for identifying a kind of communication given to a packet, whether a received packet is a specific kind of packet for disabling the VLAN settings, and, when receiving the specific kind of packet, each of the communication apparatuses disables the VLAN settings of each connection port with respect to the specific kind of packet, regards the set two or more VLANs as a same network, and transfers the packet to a desired destination apparatus.

2. A network system comprising two or more communication apparatuses, the communication apparatuses being connected by a trunk link,
   each of the communication apparatuses for performing communication among cars of a train, including:
   two or more connection ports; and
   two or more VLANs set through VLAN numbers in each connection port,
   wherein each of the communication apparatuses determines, on the basis of only information for identifying a kind of communication given to a packet, whether a received packet is a specific kind of packet for disabling the VLAN settings, and, when receiving the specific kind of packet, each of the communication apparatuses disables the VLAN settings of each connection port with respect to the specific kind of packet, regards the set two or more VLANs as a same network, and transfers the packet to a desired destination control apparatus for controlling apparatuses in the VLANs.

* * * * *